United States Patent
Kawabata

(10) Patent No.: US 10,439,865 B2
(45) Date of Patent: Oct. 8, 2019

(54) WIRELESS RELAY SYSTEM, REMOTE UNIT OF WIRELESS RELAY SYSTEM, AND RESTORATION METHOD OF WIRELESS RELAY SYSTEM

(71) Applicants: Kabushiki Kaisha Toshiba, Minato-ku (JP); Toshiba Infrastructure Systems & Solutions Corporation, Kawasaki-shi (JP)

(72) Inventor: Kensei Kawabata, Kunitachi (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 12 days.

(21) Appl. No.: 15/736,620

(22) PCT Filed: Nov. 26, 2015

(86) PCT No.: PCT/JP2015/083282
§ 371 (c)(1),
(2) Date: Dec. 14, 2017

(87) PCT Pub. No.: WO2016/203670
PCT Pub. Date: Dec. 22, 2016

(65) Prior Publication Data
US 2018/0205598 A1 Jul. 19, 2018

(30) Foreign Application Priority Data

Jun. 16, 2015 (JP) ................................. 2015-121308

(51) Int. Cl.
*H04L 12/24* (2006.01)
*H04B 17/40* (2015.01)
(Continued)

(52) U.S. Cl.
CPC ......... *H04L 41/0672* (2013.01); *H04B 17/40* (2015.01); *H04L 45/22* (2013.01);
(Continued)

(58) Field of Classification Search
None
See application file for complete search history.

(56) References Cited

U.S. PATENT DOCUMENTS 5,629,789 A * 5/1997 Myers ................. H04J 14/0297
 398/15
8,649,258 B2 * 2/2014 Suzuki .................... H04L 69/40
 370/216

(Continued)

FOREIGN PATENT DOCUMENTS

| JP | 2000-217148 A | 8/2000 |
| JP | 2004-247824 A | 9/2004 |
| KR | 100632975 B1 * | 9/2006 |

OTHER PUBLICATIONS

International Search Report dated Feb. 16, 2016 in PCT/JP2015/083282 filed Nov. 26, 2015.

*Primary Examiner* — Christine T Duong
(74) *Attorney, Agent, or Firm* — Oblon, McClelland, Maier & Neustadt, L.L.P.

(57) ABSTRACT

A wireless relay system includes a master unit and remote units. The remote units are connected to a communication path downstream of the master unit. Each remote unit includes a switching unit, a communication unit, a determiner, and a switching controller. The switching unit switches a normal connection in which the master unit or an upstream remote unit is connected to a downstream remote unit and a bypass connection in which they are connected with the communication unit not interposed therebetween. The communication unit processes a signal to be transmitted/received for communication. The determiner determines (Continued)

whether the communication unit is normal or abnormal. The switching controller switches the switching unit to the bypass connection when the communication unit is abnormal. After switching to the normal connection, the deter liner determines whether the communication unit is normal or abnormal after restarting the communication unit.

9 Claims, 5 Drawing Sheets

(51) Int. Cl.
    *H04L 12/707*    (2013.01)
    *H04L 12/939*    (2013.01)
    *H04L 12/937*    (2013.01)
    *H04W 16/26*     (2009.01)
    *H04W 24/04*     (2009.01)

(52) U.S. Cl.
    CPC .......... *H04L 49/254* (2013.01); *H04L 49/557* (2013.01); *H04W 16/26* (2013.01); *H04W 24/04* (2013.01)

(56) References Cited

U.S. PATENT DOCUMENTS

2006/0203720 A1*   9/2006   Kano ................. H04L 41/0663
                                                                        370/228
2011/0211443 A1*   9/2011   Leong ................... H04L 63/02
                                                                        370/218

* cited by examiner

WIRELESS RELAY SYSTEM, REMOTE UNIT OF WIRELESS RELAY SYSTEM, AND RESTORATION METHOD OF WIRELESS RELAY SYSTEM

CROSS-REFERENCE TO RELATED APPLICATIONS

This application is national stage application of International Application No. PCT/JP2015/083282, filed Nov. 26, 2015, which designates the United States, incorporated herein by reference, and which claims the benefit of priority from Japanese Patent Application No. 2015-121308, filed Jun. 16, 2015, the entire contents of each of which are incorporated herein by reference.

FIELD

Embodiments described herein relate generally to a wireless relay system, a remote unit of the wireless relay system, and a restoration method of the wireless relay system.

BACKGROUND

As measures taken by mobile communication carriers against insensitivity and expansion of a communication area, a wireless relay system including a master unit to which wireless signals from a base station are relayed and connected via a coaxial cable or an optical fiber, and a remote unit connected to the master unit is known. In such a wireless relay system, elimination of a dead zone and expansion of a communication area are realized by installation of a plurality of remote units which is connected to each other and also functions as wireless relay devices in a closed space where the wireless signals do not reach.

In such a wireless relay system, when any of the remote units serially connected fails, even if another remote unit connected downstream is normal, the wireless relay system cannot communicate with a terminal. Therefore, there is a known technique in which a failed remote unit is bypassed and a remote unit at the downstream of the failed remote unit and a remote unit at the upstream of the failed remote unit or the master unit are connected.

However, there is a problem that, even if failure of the remote unit is a temporary failure, communication cannot be made until the remote unit is repaired by a repair worker because the remote unit is bypassed.

Embodiments of the present invention have been made in view of the above, and an object thereof is to provide a wireless relay system capable of restoring a temporarily failed remote unit to make communication.

DETAILED DESCRIPTION

Figure 1:
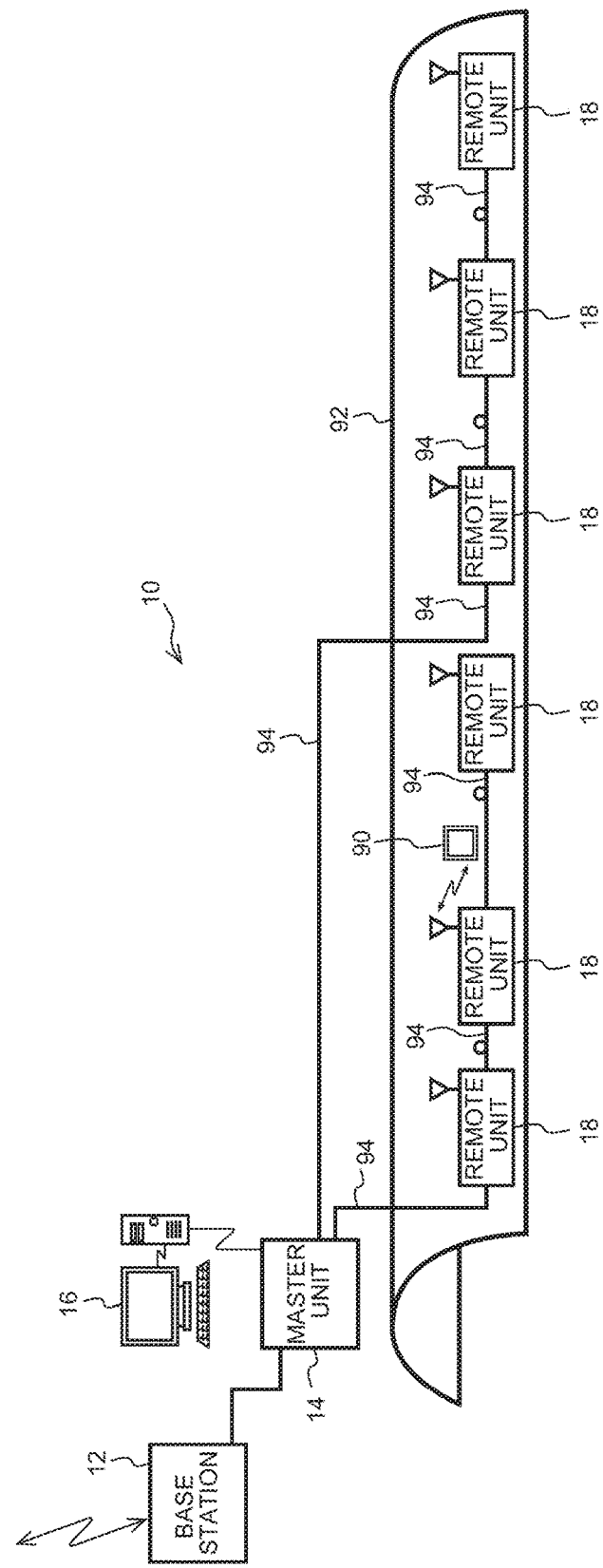
FIG. 1 is an overall configuration diagram of a wireless relay system according to a first embodiment.

According to an embodiment, a wireless relay system includes a master unit and a plurality of remote units connected to a communication path downstream of the master unit. Each of the plurality of remote units includes a switching unit, a communication unit, a determiner, and a switching controller. The switching unit switches a normal connection in which the master unit or an upstream remote unit is connected to a downstream remote unit via the communication unit, and a bypass connection in which the master unit or the upstream remote unit is connected to the downstream remote unit with the communication unit not interposed therebetween. The communication unit processes a signal to be transmitted/received for communication. The determiner determines whether the communication unit is normal or abnormal. The switching controller switches the switching unit to the bypass connection when the determiner determines that the communication unit is abnormal. The determiner restarts the communication unit and determines whether the communication unit is normal or abnormal after the switching controller switches the switching unit from the bypass connection to the normal connection.

The following exemplary embodiments and modifications include similar components. In the following descriptions, therefore, the similar components are denoted by the same reference signs, and overlapping descriptions are partly omitted. Parts included in the embodiments and the modifications can be replaced with corresponding parts in other embodiments and modifications. Further, configurations, positions, and the like of the parts included in the embodiments and the modifications are similar to those in other embodiments and modifications unless otherwise mentioned.

A wireless relay system 10 is a system which is also generally called a repeater or a distributed antenna system (DAS). The wireless relay system 10 is a system which relays communication by distributing wireless signals from a base station 12 to a master unit (abbreviated MU) 14 to which the wireless signals are relayed and connected via a coaxial cable or an optical fiber and a plurality of remote units (abbreviated RUs) 18, the communication being relayed via the remote units (abbreviated RUs) 18 installed in a closed space (for example, a building and an underground mall) where the wireless signals do not reach and connected to the master unit, so as to realize elimination of a dead zone and expansion of a communication area by mobile communication carriers.

<First Embodiment>

A first embodiment is an embodiment in a case where the wireless relay system 10 is installed in a tunnel of a traffic facility such as a railway or a highway as an example of the closed space where the wireless signals do not reach. In the wireless relay system 10 of the present embodiment, in a case where failure occurs in a device installed in an indoor space such as a general building or an underground mall, a person can easily enter the place where the device is installed to repair the device. In contrast, in a case where the wireless relay system 10 is installed in the tunnel of the traffic facility (in particular, a high-speed bullet train, or the like), for example, in order for a person to enter the tunnel to repair the device, it is necessary to stop operation of the traffic facility (in a case of a road, to close the road) for safety before repair the device. For this reason, the person needs to wait before starting the repair until night when operation of the traffic facility is over, for example.

FIG. 1 is an overall configuration diagram of the wireless relay system 10 according to the first embodiment. As illustrated in FIG. 1, the wireless relay system 10 includes the base station 12, the master unit 14, a plurality of remote units 18 serially installed in a tunnel 92 or the like, and a monitoring device 16.

The base station 12 is connected to a mobile phone network and is installed outside the tunnel 92.

The master unit 14 is connected to the base station 12 by an optical fiber, a coaxial cable, or the like. The master unit 14 transmits/receives information to/from the base station 12 by wired communication. The master unit 14 is installed outside the tunnel 92, for example, but the place of installation is not particularly limited.

The monitoring device 16 monitors the wireless relay system 10 and detects an abnormal state and the like. The monitoring device 16 has a computer and the like.

The plurality of remote units 18 are directly or indirectly connected to the master unit 14. The plurality of remote units 18 are serially connected (that is, connected in series) by an optical fiber 94 to a communication path downstream of the master unit 14. An uppermost remote unit 18 among the remote units 18 which are serially connected is connected to the master unit 14 by the optical fiber 94. The remote units 18 other than the uppermost remote unit 18 are serially connected to each other by the optical fiber 94. In other words, the remote unit 18 is connected, in the communication path, to an upstream remote unit 18 or the master unit 14, and to a downstream remote unit 18. Accordingly, the remote unit 18 functions as a wireless relay device that relays communication between the upstream remote unit 18 and the downstream remote unit 18. The plurality of remote units 18 are installed at a plurality of places different from one another inside the tunnel 92. Accordingly, the plurality of remote units 18 provide communication in an entire area inside the tunnel 92. As a result, the wireless relay system 10 provides measures against a dead zone and expansion of a communication area by the plurality of remote units 18. Each of the remote units 18 transmits/receives information to/from a terminal 90 such as a mobile phone and a smartphone by wireless communication.

Figure 2:
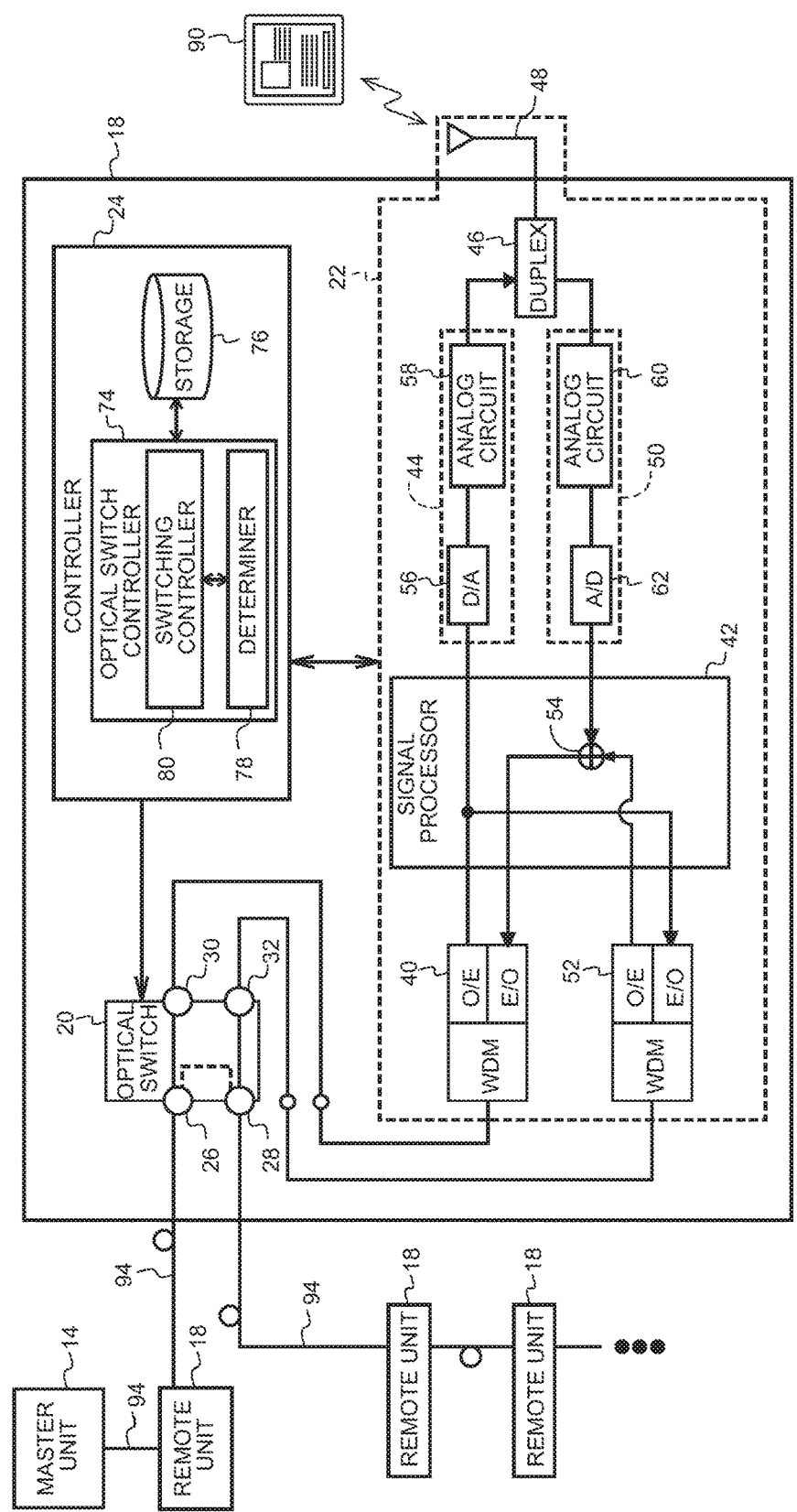
FIG. 2 is an internal configuration diagram of a remote unit.

FIG. 2 is an internal configuration diagram of the remote unit 18. As illustrated in FIG. 2, each of the plurality of remote units 18 includes an optical switch 20 which is an example of a switching unit, a communication unit 22, and a controller 24.

The optical switch 20 has four terminals 26, 28, 30, 32, and switches connection of these four terminals 26, 28, 30, 32. The terminal 26 is connected to the upstream remote unit 18 or the master unit 14. The terminal 28 is connected to the downstream remote unit 18. The terminal 30 and the terminal 32 are connected to the communication unit 22.

In a normal state where the communication unit 22 can communicate with the terminal 90, as indicated by a solid line in FIG. 2, the optical switch 20 connects the terminal 26 and the terminal 30, and connects the terminal 28 and the terminal 32 (hereinafter referred to as normal connection). With this configuration, in the normal connection, the optical switch 20 connects the upstream remote unit 18 on the communication path or the master unit 14 and the downstream remote unit 18 on the communication path via the communication unit 22.

In an abnormal state where the communication unit 22 cannot communicate with the terminal 90, and an abnormal state where power supply to the remote unit 18 is not turned on or the power supply cannot be tuned on due to abnormality in a power supply device, for example, the optical switch 20 connects the terminal 26 and the terminal 28, as indicated by a dotted line in FIG. 2. The terminal 30 and the terminal 32 are not connected to the other terminal 26 and terminal 28. With this configuration, the optical switch 20 connects (hereinafter referred to as bypass connection) the upstream remote unit 18 on the communication path or the master unit 14 and the downstream remote unit 18 on the communication path with the communication unit 22 not interposed therebetween. In the bypass connection, therefore, the communication unit 22 is not connected to the communication path and is not involved in communication. The optical switch 20 switches between the normal connection and the bypass connection under the control of the controller 24.

The communication unit 22 executes processing such as conversion of a signal of communication to be transmitted/received, and transmits/receives the signal to/from the other remote units 18, the terminal 90, and the like. The communication unit 22 is connected to the optical switch 20. The communication unit 22 includes an upstream photoelectric converter 40, a signal processor 42, a transmitter 44, a duplexer 46, an antenna 48, a receiver 50, and a downstream photoelectric converter 52.

The upstream photoelectric converter 40 is connected between the terminal 30 of the optical switch 20 and the signal processor 42. The upstream photoelectric converter 40 converts an optical signal input from the upstream remote unit 18 or the master unit 14 to an electric signal via the terminal 26 and the terminal 30 of the optical switch 20. The upstream photoelectric converter 40 outputs the converted electric signal to the signal processor 42. Further, the upstream photoelectric converter 40 converts the electric signal input from the signal processor 42 into an optical signal. The upstream photoelectric converter 40 outputs the converted optical signal to the upstream remote unit 18 or the master unit 14 via the terminal 30 and the terminal 26 of the optical switch 20.

The signal processor 42 is connected to the upstream photoelectric converter 40, the transmitter 44, the downstream photoelectric converter 52, and the receiver 50. The signal processor 42 outputs the electric signal input from the upstream photoelectric converter 40 to the transmitter 44 and the downstream photoelectric converter 52. The signal processor 42 includes an adder 54. The signal processor 42 adds, namely, multiplexes the electric signal input from the receiver 50 and the downstream photoelectric converter 52 by the adder 54 and outputs the multiplexed electric signal to the upstream photoelectric converter 40.

The transmitter 44 is connected between the signal processor 42 and the duplexer 46. The transmitter 44 includes a D/A converter 56 and an analog circuit 58. In the transmitter 44, the D/A converter 56 converts the digital electric signal output from the signal processor 42 into an analog electric signal. The analog circuit 58 converts the analog electric signal in a baseband output from the D/A converter 56 into an electric signal of wireless frequency, amplifies the electric signal, and thereafter, transmits the electric signal to the terminal 90 via the duplexer 46 and the antenna 48.

The duplexer 46 is connected to the transmitter 44, the receiver 50, and the antenna 48. The duplexer 46 outputs the electric signal output from the transmitter 44 to the antenna 48 without outputting the electric signal to the receiver 50. The duplexer 46 outputs an electric signal received by the antenna 48 from the external terminal 90 to the receiver 50 without outputting the electric signal to the transmitter 44.

The antenna 48 transmits the electric signal input from the transmitter 44 via the duplexer 46 to the terminal 90. The antenna 48 receives the electric signal transmitted by the external terminal 90 and outputs the electric signal to the duplexer 46.

The receiver 50 is connected between the signal processor 42 and the duplexer 46. The receiver 50 includes an analog circuit 60 and an A/D converter 62. In the receiver 50, the analog circuit 60 amplifies the electric signal of wireless frequency received from the terminal 90 via the antenna 48 and converts the electric signal into an electric signal in a baseband. The A/D converter 62 converts the analog electric signal in a baseband output from the analog circuit 60 into a digital electric signal, and outputs the electric signal to the signal processor 42.

The downstream photoelectric converter 52 is connected between the terminal 32 of the optical switch 20 and the signal processor 42. The downstream photoelectric converter 52 converts the electric signal input from the signal processor 42 into an optical signal. The downstream photoelectric converter 52 outputs the converted optical signal to the downstream remote unit 18 via the terminal 28 and the terminal 32 of the optical switch 20. Further, the downstream photoelectric converter 52 converts an optical signal input from the downstream remote unit 18 into an electric signal via the terminal 28 and the terminal 32 of the optical switch 20. The downstream photoelectric converter 52 outputs the converted electric signal to the signal processor 42.

The controller 24 manages control of the remote unit 18 in general. An example of the controller 24 is a computer. The controller 24 includes an optical switch controller 74 and a storage 76.

The optical switch controller 74 includes an arithmetic processing unit such as a central processing unit (CPU). The optical switch controller 74 includes a determiner 78 and a switching controller 80. For example, the optical switch controller 74 functions as the switching controller 80 and the determiner 78 by reading a program stored in the storage 76. Note that some or all of the determiner 78 and the switching controller 80 may be constituted by hardware such as a circuit.

The determiner 78 controls the communication unit 22 of the remote unit 18. The determiner 78 determines whether the communication unit 22 is normal in which communication is possible, or abnormal in which communication is impossible. When determining that the communication unit 22 is abnormal, the determiner 78 outputs a signal indicating abnormality to the switching controller 80 to switch the optical switch 20 to the bypass connection. The abnormality in the communication unit 22 and the controller 24 determined by the determiner 78 includes power supply abnormality and communication abnormality. The power supply abnormality includes abnormality in the power supply that supplies electric power to the communication unit 22 and abnormality in supply of electric power. Note that, in a case where the controller 24 does not operate due to the power supply abnormality, the optical switch 20 autonomously establishes a bypass connection without relying on the control of the controller 24. The communication abnormality includes abnormality in a clock supplied to the communication unit 22 for communication. Further, after the determiner 78 determines that there is abnormality, the switching controller 80 switches the optical switch 20 from the bypass connection to the normal connection. Thereafter, the determiner 78 restarts the remote unit 18 including the communication unit 22 and the controller 24 and then determines whether the communication unit 22 is normal or abnormal again. For example, after the determiner 78 determines that there is abnormality, the determiner 78 restarts the remote unit 18 at a predetermined restoration time. The determiner 78 restarts any or all of the upstream photoelectric converter 40, the signal processor 42, the transmitter 44, the duplexer 46, the receiver 50, and the downstream photoelectric converter 52 of the communication unit 22, and the controller 24. When determining that the restarted communication unit 22 is normal, the determiner 78 maintains the normal connection.

The switching controller 80 controls the optical switch 20. For example, in a state where the determiner 78 determines that the communication unit 22 is normal in which communication is possible, as indicated by a solid line in FIG. 2, the switching controller 80 connects the terminal 26 and the terminal 30, and connects the terminal 28 and the terminal 32 so that the optical switch 20 is switched to the normal connection. When the determiner 78 determines that the communication unit 22 is abnormal in which communication is impossible, as indicated by a dotted line in FIG. 2, the switching controller 80 connects the terminal 26 and the terminal 28, and switches the optical switch 20 to the bypass connection. Further, after the determiner 78 determines that the communication unit 22 is abnormal and the switching controller 80 switches the optical switch 20 to the bypass connection, the switching controller 80 switches the optical switch 20 from the bypass connection to the normal connection at the restoration time.

The storage 76 includes a volatile random access memory (RAM), a nonvolatile flash memory, and the like. The storage 76 stores a program read by the optical switch controller 74, a parameter required for executing the program, and the like.

Next, the operation of the remote unit 18 in a state where the determiner 78 determines that the communication unit 22 is normal will be described.

First, the operation of the remote unit 18 in a case where the communication unit 22 is in the normal state will be described. In the remote unit 18 in the normal state, as indicated by the solid line in FIG. 2, the switching controller 80 of the optical switch controller 74 connects the terminal 26 and the terminal 30, and connects the terminal 28 and the terminal 32 of the optical switch 20.

The operation of the remote unit 18 in a case where an optical signal is input from the upstream remote unit 18 or the master unit 14 will be described. When an optical signal is input from the upstream remote unit 18 or the master unit 14 to the terminal 26, the optical switch 20 outputs the electric signal from the terminal 30 to the upstream photoelectric converter 40. The upstream photoelectric converter 40 outputs the electric signal to the transmitter 44 and the downstream photoelectric converter 52 via the signal processor 42. After converting the analog electric signal in a baseband into wireless frequency, the transmitter 44 transmits the electric signal to the terminal 90 via the duplexer 46 and the antenna 48. Further, the downstream photoelectric converter 52 converts the electric signal input from the upstream photoelectric converter 40 into an optical signal via the signal processor 42, and outputs the optical signal to the terminal 32 of the optical switch 20. The optical switch 20 outputs, from the terminal 28, the optical signal input to the terminal 32 to the downstream remote unit 18.

The operation of the remote unit 18 in a case where the remote unit 18 receives an electric signal from the terminal 90 and in a case where an optical signal is input from the downstream remote unit 18 will be described. When the antenna 48 receives an electric signal from the terminal 90, the antenna 48 outputs the electric signal to the receiver 50 via the duplexer 46. The receiver 50 converts the analog electric signal of wireless frequency into a digital electric signal in a baseband and outputs the electric signal to the adder 54 of the signal processor 42. The optical switch 20 outputs an optical signal input from the downstream remote unit 18 to the terminal 28 to the downstream photoelectric converter 52 via the terminal 32. The downstream photoelectric converter 52 converts the optical signal into an electric signal, and outputs the electric signal to the adder 54 of the signal processor 42. The adder 54 of the signal processor 42 adds, namely, multiplexes the electric signal input from the receiver 50 and the electric signal input from the downstream photoelectric converter 52 and outputs the multiplexed electric signal to the upstream photoelectric converter 40. The upstream photoelectric converter 40 converts the multiplexed electric signal into an optical signal and outputs the optical signal to the terminal 30 of the optical switch 20. The optical switch 20 outputs, from the terminal 26, the optical signal input to the terminal 30 to the upstream remote unit 18 or the master unit 14.

Next, the operation of the remote unit 18 in which the communication unit 22 is in the abnormal state will be described. In the remote unit 18 in which the communication unit 22 is in the abnormal state, as indicated by the dotted line in FIG. 2, the switching controller 80 of the optical switch controller 74 establishes the bypass connection between the terminal 26 and the terminal 28 of the optical switch 20. In this state, the remote unit 18 outputs, from the terminal 28 to the downstream remote unit 18 with the communication unit 22 not interposed therebetween, an optical signal input from the upstream remote unit 18 or the master unit 14 to the terminal 26 of the optical switch 20. Further, the remote unit 18 outputs, from the terminal 26 to the upstream remote unit 18 or the master unit 14 with the communication unit 22 not interposed therebetween, an optical signal input from the downstream remote unit 18 to the terminal 28 of the optical switch 20. In other words, the remote unit 18 in the abnormal state outputs the input optical signal without performing any conversion and processing.

Figure 3:
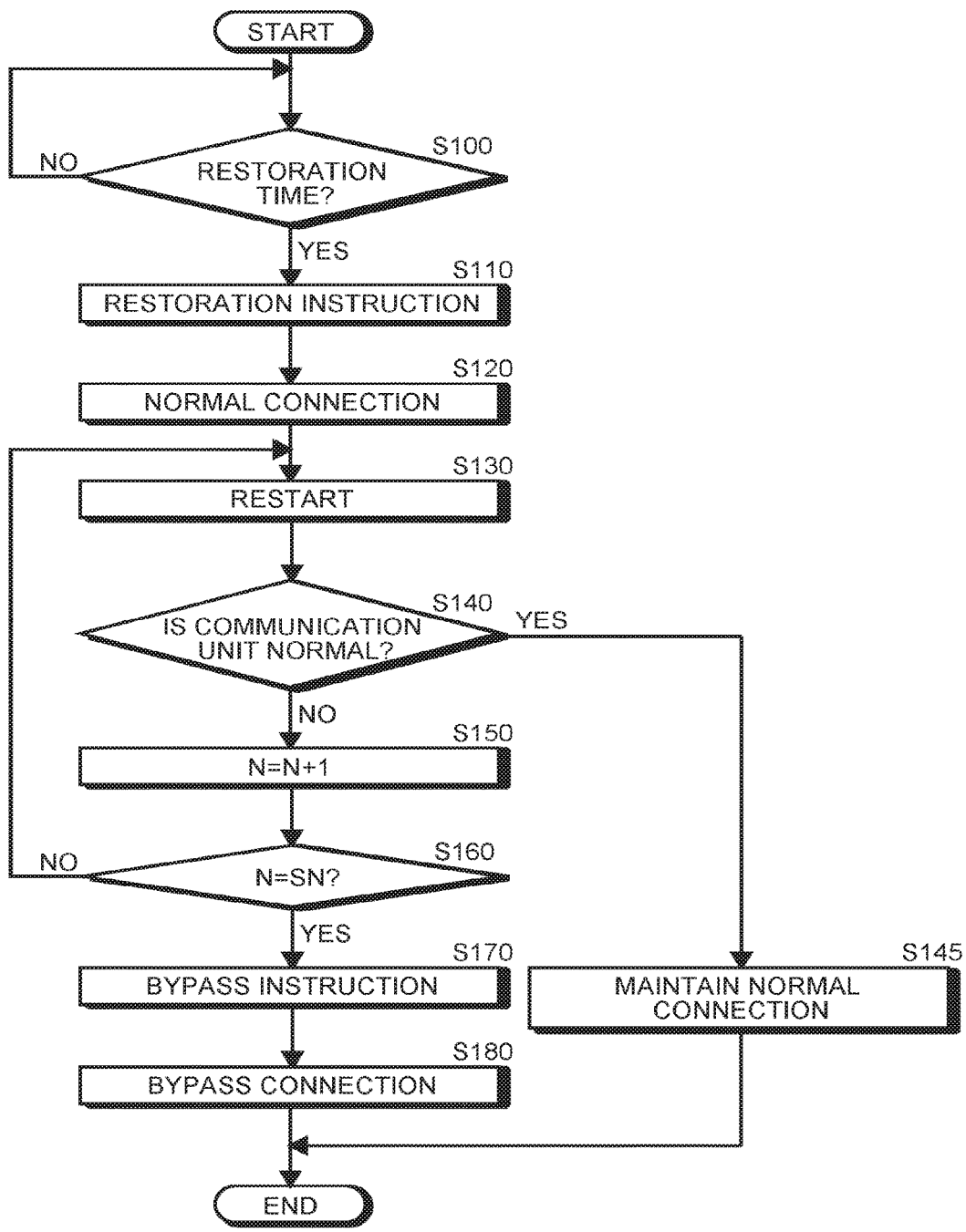
FIG. 3 is a flowchart of restoration processing executed by a controller in a case where abnormality of a communication unit is detected.

FIG. 3 is a flowchart of restoration processing executed by the optical switch controller 74 in a case where the communication unit 22 is determined to be abnormal. With reference to FIG. 3, the restoration processing in the abnormal state will be described.

The restoration processing in the abnormal state of the communication unit 22 starts from a state where the optical switch 20 is switched to the bypass connection indicated by the dotted line in FIG. 2, in a case where the determiner 78 determines that the communication unit 22 is abnormal. In the restoration processing, the determiner 78 determines whether or not a restoration time comes (S100). The restoration time is preset and stored in the storage 76. For example, the restoration time is set to midnight such as 2 am, when communication is less performed between the remote unit 18 and the terminal 90. The determiner 78 stands by until the restoration time comes (S100: No).

When determining that the restoration time comes (S100: Yes), the determiner 78 outputs a restoration instruction to the switching controller 80 (S110). When acquiring the restoration instruction, the switching controller 80 switches the optical switch 20 from the bypass connection to the normal connection (S120). After outputting the restoration instruction, the determiner 78 restarts the remote unit 18 (S130).

In a state where the remote unit 18 is restarted, the determiner 78 determines whether the communication unit 22 is normal or abnormal (S140). When determining that the communication unit 22 is in the normal state in which normal communication is possible (S140: Yes), the determiner 78 maintains the normal connection of the optical switch 20 (S145) and ends the restoration processing. As a result, the remote unit 18 is restored to perform the normal communication by the communication unit 22.

On the other hand, when determining that the communication unit 22 is in the abnormal state in which normal communication is impossible (S140: No), the determiner 78 increments a determination count N by 1 (S150). When the restoration processing is started, the determination count N is set to an initial value (for example, 0) and stored in the storage 76.

The determiner 78 determines whether or not the determination count N is the prescribed number of times SN (S160). The prescribed number of times SN is preset and stored in the storage 76. An example of the prescribed number of times SN is several times. When determining that the determination count N is not the prescribed number of times SN (S160: No), the determiner 78 restarts the remote unit 18 and determines whether or not the communication unit 22 is normal. The determiner 78 repeats steps S130 to S150 until the determiner 78 determines that the communication unit 22 is normal. Thereafter, the determiner 78 repeats steps S130 to S150, and when determining that the determination count N has reached the prescribed number of times SN (S160: Yes), outputs a bypass instruction to the switching controller 80 (S170). When obtaining the bypass instruction, the switching controller 80 returns the optical switch 20 to the bypass connection (S180). In other words, in a case where the determiner 78 does not determine that the communication unit 22 is normal even if the communication unit 22 is restarted the prescribed number of times SN, the switching controller 80 switches the optical switch 20 to the bypass connection. As a result, the optical switch controller 74 ends the restoration processing without restoring the communication unit 22 of the remote unit 18.

As described above, in the remote unit 18 of the wireless relay system 10, after the determiner 78 restarts the remote unit 18 determined to be abnormal and the switching controller 80 switches the optical switch 20 to the normal connection, the determiner 78 determines again whether the communication unit 22 is normal or abnormal. With this configuration, the determiner 78 can correctly determine, only by restarting the remote unit 18, the remote unit 18 that normally operates though it has temporarily failed, and therefore can easily restore communication by the remote unit 18. Further, the controller 24 can restore the normal communication unit 22 which is temporarily failed, without relying on repair by a repair worker or the like. Therefore, even if the remote unit 18 of the wireless relay system 10 is installed in a place such as the tunnel 92 where it is difficult for a person to enter to perform repair, the controller 24 of each remote unit 18 can be easily and quickly restored to perform the normal communication. As a result, the controller 24 of each remote unit 18 can omit an application of operation in the tunnel 92 or the like necessary for starting communication again, and can reduce time required for the operation.

In the remote unit 18, the determiner 78 executes restarting of the remote unit 18 at a preset restoration time. Thus, the controller 24 can execute restarting of the remote unit 18 at night, when the remote unit 18 hardly performs communication, for example. Accordingly, the controller 24 can realize restoration of the communication unit 22 while reducing an influence on the communication of the downstream remote unit 18, the influence being caused by connecting the communication unit 22.

In the remote unit 18, when the determiner 78 determines that the restarted communication unit 22 is abnormal, the switching controller 80 returns the optical switch 20 to the bypass connection. As a result, in a case where the failure of the communication unit 22 is not a temporary failure, the controller 24 can return the downstream remote unit 18 to the communicable state.

In the remote unit 18, the determiner 78 restarts the communication unit 22 a prescribed number of times SN to determine whether or not the communication unit 22 is normal. Therefore, accuracy of determination of the normal communication unit 22 can be improved.

In the above-described embodiment, the wireless relay system as a measure against insensitivity of a mobile phone network has been described. However, the wireless relay system can also be used as a measure against insensitivity of a public wireless LAN system connected to the Internet network. In this case, a similar effect can be obtained by connecting the master unit 14 to the Internet network which is not illustrated, instead of the base station 12.

<Second Embodiment>

Figure 4:
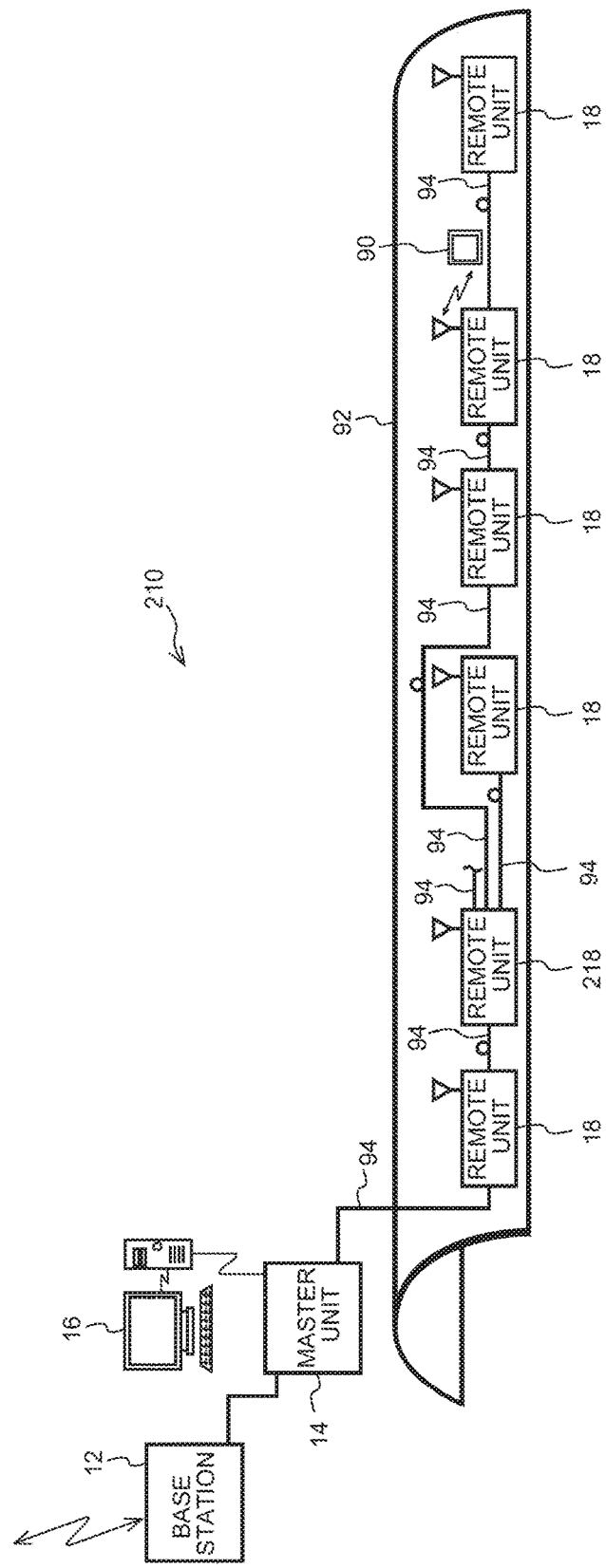
FIG. 4 is an overall configuration diagram of a wireless relay system according to a second embodiment.

FIG. 4 is an overall configuration diagram of a wireless relay system 210 according to a second embodiment. In the wireless relay system 210 illustrated in FIG. 4, remote units 218 are not serially connected, and a communication path is branched at a specific remote unit 218.

Figure 5:
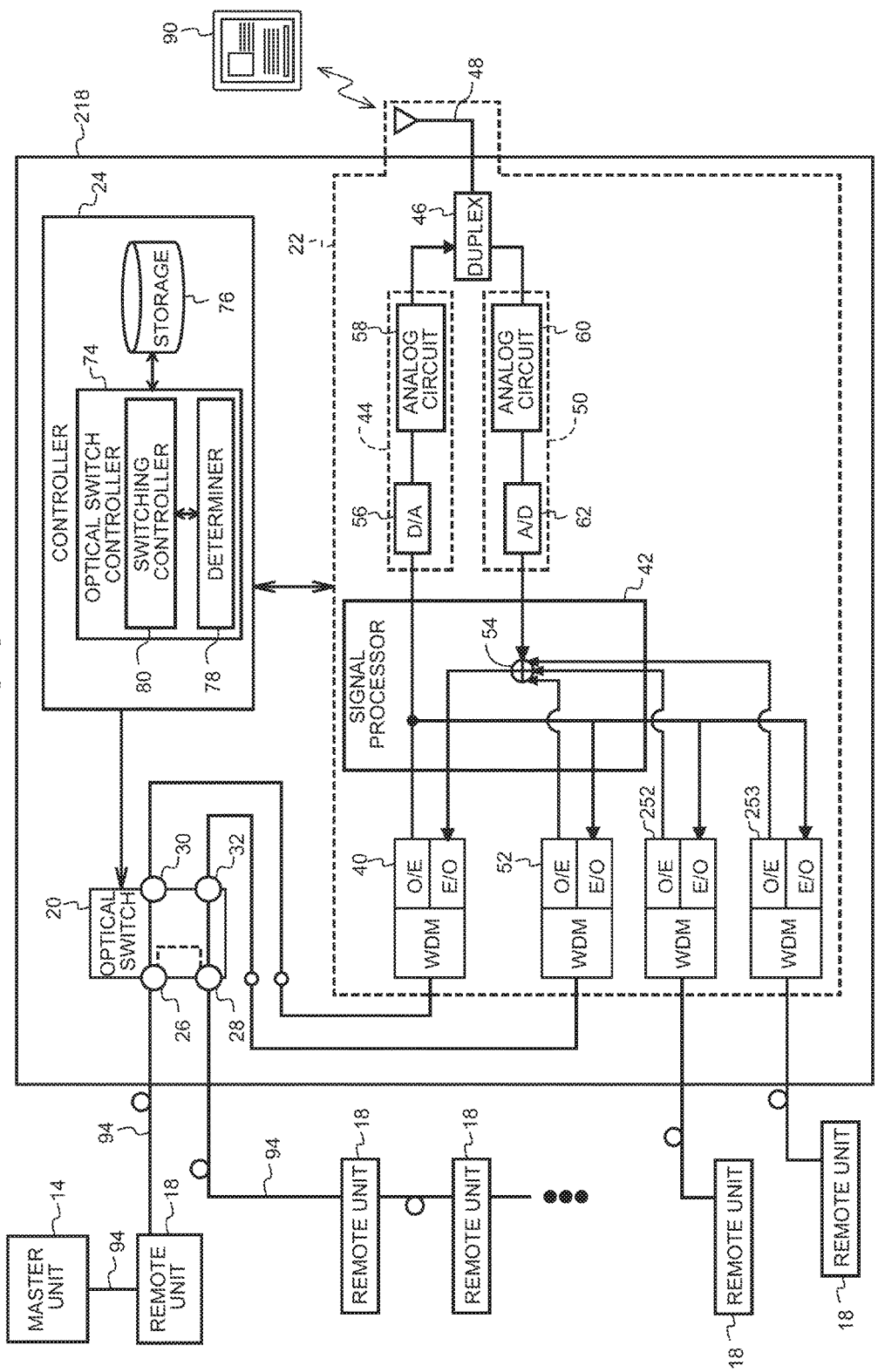
FIG. 5 is an internal configuration diagram of a remote unit according to the second embodiment.

FIG. 5 is an internal configuration diagram of a remote unit 218 according to the second embodiment. As illustrated in FIG. 5, the remote unit 218 further includes a second downstream photoelectric converter 252 and a third downstream photoelectric converter 253.

The second downstream photoelectric converter 252 is connected to the upstream photoelectric converter 40, the adder 54 of the signal processor 42, and the downstream remote unit 18. The second downstream photoelectric converter 252 converts an electric signal input from the upstream photoelectric converter 40 into an optical signal, and outputs the optical signal to the downstream remote unit 18. The second downstream photoelectric converter 252 converts an optical signal input from the downstream remote unit 18 into an electric signal, and outputs the electric signal to the adder 54 of the signal processor 42.

The third downstream photoelectric converter 253 is connected to the upstream photoelectric converter 40, the adder 54 of the signal processor 42, and the downstream remote unit 18. Note that the third downstream photoelectric converter 253 is connected to the remote unit 18 different from the remote unit 18 connected to the second downstream photoelectric converter 252. The third downstream photoelectric converter 253 converts an electric signal input from the upstream photoelectric converter 40 into an optical signal, and outputs the optical signal to the downstream remote unit 18. The third downstream photoelectric converter 253 converts an optical signal input from the downstream remote unit 18 into an electric signal, and outputs the electric signal to the adder 54 of the signal processor 42.

In the remote unit 218, the adder 54 of the signal processor 42 adds the three electric signals output from the downstream photoelectric converter 52, the second downstream photoelectric converter 252, and the third downstream photoelectric converter 253, and outputs the added electric signal to the upstream photoelectric converter 40.

The configurations of the above-described embodiments may be changed as appropriate. Each of the above-described embodiments may be appropriately combined.

For example, in the above-described embodiments, the remote units 18 are connected to each other by the optical fiber 94, but the remote units 18 may be connected to each other by an electric wire and the remote units 18 may transmit/receive information to/from each other by electric communication. Further, the remote unit 18 may be connected to the master unit 14 by the electric wire.

In the above-described embodiments, the wireless relay system 10 in which the remote unit 18 is installed in the tunnel 92 is taken as an example, but the present invention is not limited to the example. For example, the above-described embodiments may be applied to the wireless relay system 10 in which the remote unit 18 is installed in a building and an underground mall.

In the above-described embodiments, the optical switch controller 74 starts the restoration processing at a predetermined time, but the present invention is not limited to this configuration, and the restoration process may be started at a predetermined timing. For example, the optical switch controller 74 may start the restoration processing after the communication unit 22 is determined to be in the abnormal state and a predetermined time has elapsed from the state where the optical switch 20 is switched to the bypass connection.

In the above-described embodiments, the optical switch controller 74 repeats restarting the prescribed number of times SN, but the present invention is not limited this configuration. For example, the optical switch controller 74 may restart only once to determine whether or not the communication unit 22 is normal.

In the above-described embodiments, the remote unit 18 is restarted, but only the communication unit 22 may be restarted.

An order of the steps of the restoration processing of the above-described embodiments may be changed as appropriate. For example, the order of processing in step S120 and processing in step S130 may be reversed. That is, the switching controller 80 may switch the optical switch 20 from the bypass connection to the normal connection after the determiner 78 restarts the communication unit 22. Even in this case, the determiner 78 determines whether the communication unit 22 is normal or abnormal after the switching controller 80 switches the optical switch 20 to the normal connection.

In the above-described embodiments, a case in which the controller 24 is provided in the remote unit 18 is exemplified, but a part or the whole of the controller 24 may be provided in another equipment such as the master unit 14 or the base station 12.

In the above-described embodiments, the communication unit 22 includes the upstream photoelectric converter 40, the signal processor 42, the transmitter 44, the duplexer 46, the antenna 48, the receiver 50, the downstream photoelectric converter 52. However, the configuration of the communication unit 22 may be changed as appropriate. The communication unit 22 may be configured to have some of the upstream photoelectric converter 40, the signal processor 42, the transmitter 44, the duplexer 46, the antenna 48, the receiver 50, and the downstream photoelectric converter 52.

Also in the above-described embodiment, the wireless relay system as a measure against insensitivity of the mobile phone network has been described, but the wireless relay system can also be used as a measure against insensitivity of the public wireless LAN system connected to the Internet network. In this case, a similar effect can be obtained by connecting the master unit 14 to the Internet network which is not illustrated, instead of the base station 12.

While several embodiments of the present invention have been described, these embodiments have been presented by way of example and are not intended to limit the scope of the invention. These novel embodiments can be implemented in various other forms, and various omissions, substitutions, and modifications can be made without departing from the spirit of the invention. These embodiments and modifications thereof are included in the scope and gist of the invention and are included in the invention described in the claims and the equivalent scope thereof.

The invention claimed is:

1. A wireless relay system comprising:
a master unit; and
a plurality of remote units connected to a communication path downstream of the master unit, each of the remote units wirelessly communicating with a terminal, wherein
each of the plurality of remote units includes
a communication device that, after receiving a signal that has been transmitted from the master unit or an upstream remote unit of the plurality of remote units, wirelessly communicates the received signal with the terminal and transmits the received signal to a downstream remote unit of the plurality of remote units,
a switch that switches between a normal connection in which the master unit or the upstream remote unit is connected to the downstream remote unit via the communication device, and a bypass connection in which the master unit or the upstream remote unit is connected to the downstream remote unit with the communication device not interposed therebetween, and
a processor that
determines whether the communication device is normal or abnormal,
switches the switch to the bypass connection when the processor determines that the communication device is abnormal, and switches the switch to the normal connection at a predetermined restoration time after the switch is switched to the bypass connection, and
restarts the communication device after the switch is switched to the normal connection.

2. The wireless relay system according to claim 1, wherein the processor switches the switch to the bypass connection when the processor determines that the restarted communication device is abnormal.

3. The wireless relay system according to claim 1, wherein the processor switches the switch to the bypass connection when the processor determines that the communication device restarted a predetermined prescribed number of times is abnormal.

4. A remote unit for a wireless relay system, comprising:
a communication device that, after receiving a signal that has been transmitted from a master unit that is upstream in a communication path or an upstream remote unit, wirelessly communicates the received signal with a terminal and transmits the received signal to a downstream remote unit;
a switch that switches between a normal connection in which the master unit or the upstream remote unit is connected to the downstream remote unit via the communication device, and a bypass connection in which the master unit or the upstream remote unit is connected to the downstream remote unit with the communication device not interposed therebetween; and
a processor that
determines whether the communication device is normal or abnormal,
switches the switch to the bypass connection when the processor determines that the communication device is abnormal, and switches the switch to the normal connection at a predetermined restoration time after the switch is switched to the bypass connection, and
restarts the communication device after the switch is switched to the normal connection.

5. The remote unit for the wireless relay system according to claim 4, wherein the processor switches the switch to the bypass connection when the processor determines that the restarted communication device is abnormal.

6. The remote unit for the wireless relay system according to claim 4, wherein the processor switches the switch to the bypass connection when the processor determines that the communication device restarted a predetermined prescribed number of times is abnormal.

7. A restoration method of a wireless relay system that includes a master unit and a plurality of remote units connected to a communication path downstream of the master unit, each of the remote units wirelessly communicating with a terminal, each of the plurality of remote units including a communication device that, after receiving a signal that has been transmitted from the master unit or an upstream remote unit of the plurality of remote units, wirelessly communicates the received signal with the terminal and transmits the received signal to a downstream remote unit of the plurality of remote units, and a switch that switches between a normal connection in which the master unit or the upstream remote unit is connected to the downstream remote unit via the communication device, and a bypass connection in which the master unit or the upstream remote unit is connected to the downstream remote unit with the communication device not interposed therebetween, the method comprising:
determining whether the communication device is normal or abnormal;
switching the switch to the bypass connection when it is determined that the communication device is abnormal, and switching the switch to the normal connection at a predetermined restoration time after the switch is switched to the bypass connection; and
restarting the communication device after the switch is switched to the normal connection.

8. The restoration method of the wireless relay system according to claim 7, further comprising secondly switching the communication device to the bypass connection when the communication device is determined to be abnormal at the determining.

9. The restoration method of the wireless relay system according to claim 7, further comprising a step of secondly switching the communication device to the bypass connection when the communication device is determined to be abnormal after the restarting and the determining are performed a prescribed number of times.

* * * * *